United States Patent
Olson et al.

(10) Patent No.: US 7,346,995 B2
(45) Date of Patent: Mar. 25, 2008

(54) SYSTEM AND METHOD FOR COMPENSATING FOR MAGNETIC DISTURBANCE OF A COMPASS BY A MOVEABLE VEHICLE ACCESSORY

(75) Inventors: Thomas R. Olson, Holland, MI (US); Thomas S. Wright, Holland, MI (US); Sven Natus, Limburg (DE)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 10/554,838

(22) PCT Filed: Apr. 30, 2004

(86) PCT No.: PCT/US2004/013459

§ 371 (c)(1), (2), (4) Date: Dec. 21, 2006

(87) PCT Pub. No.: WO2004/099715

PCT Pub. Date: Nov. 18, 2004

(65) Prior Publication Data

US 2007/0101596 A1    May 10, 2007

Related U.S. Application Data

(60) Provisional application No. 60/466,670, filed on Apr. 30, 2003.

(51) Int. Cl.
*G01C 17/38* (2006.01)
(52) U.S. Cl. .................................................. 33/356
(58) Field of Classification Search .............. 33/356, 33/357, 355 R
See application file for complete search history.

(56) References Cited

U.S. PATENT DOCUMENTS 3,991,361 A * 11/1976 Mattern et al. .............. 324/244
5,511,319 A    4/1996 Geerlings et al.
5,664,335 A    9/1997 Suman et al.

(Continued)

FOREIGN PATENT DOCUMENTS

DE    38 33 798 A1    4/1990

(Continued)

*Primary Examiner*—Yaritza Guadalupe-McCall
(74) *Attorney, Agent, or Firm*—Foley & Lardner LLP (57) ABSTRACT

A vehicle compass system for compensating for magnetic disturbances caused by a moveable vehicle accessory includes a magnetic field sensor and a control circuit coupled to the moveable vehicle accessory and the magnetic field sensor. The magnetic field sensor is positioned at a distance from the moveable vehicle accessory and is configured to determine an orientation of the magnetic field sensor with respect to the Earth's magnetic field and to generate magnetic field data. The control circuit is configured to receive a position signal from the moveable vehicle accessory indicating whether the moveable vehicle accessory is changing position, to receive magnetic field data from the magnetic field sensor, to compare first magnetic field data generated prior to the change in position of the moveable vehicle accessory to second magnetic field data generated after the change in position of the moveable vehicle accessory and to generate a correction value based on the comparison of the first magnetic field data and the second magnetic field data. The correction value is used to correct for the magnetic disturbance caused by the moveable vehicle accessory.

24 Claims, 6 Drawing Sheets

U.S. PATENT DOCUMENTS

| | | |
|---|---|---|
| 6,023,229 A | 2/2000 | Bugno et al. |
| 6,140,933 A | 10/2000 | Bugno et al. |
| 6,418,376 B1 | 7/2002 | Olson |
| 6,651,003 B2 * | 11/2003 | Woloszyk et al. ............ 33/356 |
| 7,020,971 B1 * | 4/2006 | Currie et al. ................. 33/356 |
| 7,127,823 B2 * | 10/2006 | Parks et al. ................... 33/356 |
| 7,191,533 B2 * | 3/2007 | Parks et al. ................... 33/356 |
| 7,225,551 B2 * | 6/2007 | Fillatreau et al. ............. 33/356 |
| 2003/0140510 A1 | 7/2003 | Woods et al. |
| 2007/0163132 A1 * | 7/2007 | Parks et al. ................... 33/356 |

FOREIGN PATENT DOCUMENTS

EP  0 237 806 B1  9/1987

* cited by examiner

SYSTEM AND METHOD FOR COMPENSATING FOR MAGNETIC DISTURBANCE OF A COMPASS BY A MOVEABLE VEHICLE ACCESSORY

CROSS-REFERENCE TO RELATED APPLICATIONS

This application claims the benefit of U.S. Provisional Application Ser. No. 60/466,670, filed Apr. 30, 2003.

FIELD OF THE INVENTION

The present invention relates to an electronic compass, in particular, to an electronic compass used in a vehicle.

BACKGROUND OF THE INVENTION

Electronic compasses are commonly used in vehicles as an aid for direction finding and navigation. An electronic compass may be positioned in a vehicle on the instrument panel, the rearview mirror, in an overhead console, or at other locations within the vehicle. Typically, changes in the vehicle's magnetic field can cause erroneous compass displays. An electronic compass mounted in a vehicle will detect a variety of magnetic disturbances that can effect the compass reading. For example, a compass mounted in an instrument panel of a vehicle may detect interfering magnetic fields caused by various vehicle subsystems such as the motor for the vehicle HVAC system, an audio system, stepper motors for instrument panel gauges, front window defroster, etc. A compass mounted near the trunk of the vehicle (e.g., the rear package tray) may be affected by a disturbance caused by a rear window defroster. A compass mounted in an overhead console may be affected by subsystems in close proximity to the magnetic sensors of the electronic compass. The vehicle's magnetism may also be affected when, for example, a vehicle door or other closure member such as a trunk, hood, tailgate, etc. is opened while the vehicle is stopped.

Another source of magnetic disturbances in a vehicle that can cause errors in a compass reading is a moveable vehicle accessory such as a sunroof, a seat or a convertible top. For example, the measurement of an electronic compass mounted in an overhead console of a vehicle, or other appropriate location, may be affected by the operation of a sunroof (e.g., as the sunroof moves between various positions or the type of position of the sunroof such as partially open, fully closed, etc.). Therefore, a need exists for a system and method for compensating for magnetic disturbance caused by a moveable vehicle accessory.

SUMMARY OF THE INVENTION

In accordance with an embodiment, a vehicle compass system for compensating for magnetic disturbances caused by a moveable vehicle accessory includes a magnetic field sensor positioned at a distance from the moveable vehicle accessory and configured to determine an orientation of the magnetic field sensor with respect to the Earth's magnetic field and to generate magnetic field data and a control circuit coupled to the moveable vehicle accessory and the magnetic field sensor, the control circuit configured to receive a position signal from the moveable vehicle accessory indicating whether the moveable vehicle accessory is changing position, to receive magnetic field data from the magnetic field sensor, to compare first magnetic field data generated prior to the change in position of the moveable vehicle accessory to second magnetic field data generated after the change in position of the moveable vehicle accessory and to generate a correction value based on the comparison of the first magnetic field data and the second magnetic field data. The correction value is used to correct for the magnetic disturbance caused by the moveable vehicle accessory.

In accordance with another embodiment, a method for compensating for magnetic disturbances of a compass caused by a moveable vehicle accessory positioned a distance from a magnetic field sensor of the compass includes determining if the moveable vehicle accessory is changing position, determining first magnetic field data prior to the change in position of the moveable vehicle accessory, determining second magnetic field data after the change in position of the moveable vehicle accessory, comparing the first magnetic field data and the second magnetic field data, generating a correction value based on the comparison of the first magnetic field data and the second magnetic field data, and updating at least one calibration value of the compass based on the correction value.

In accordance with another embodiment, method for compensating for magnetic disturbances of a compass caused by a moveable vehicle accessory positioned a distance from a magnetic field sensor of the compass includes determining if the moveable vehicle accessory is changing position, determining first magnetic field data prior to the change in position of the moveable vehicle accessory, determining second magnetic field data after the change in position of the moveable vehicle accessory, comparing the first magnetic field data and the second magnetic field data, generating a correction value based on the comparison of the first magnetic field data and the second magnetic field data, and correcting third magnetic field data determined after the change in position of the moveable vehicle accessory based on the correction value.

In accordance with another embodiment, a method for compensating for magnetic disturbances caused by a moveable vehicle accessory includes receiving magnetic field data from a magnetic field sensor positioned at a distance from the moveable vehicle accessory, recording the data from the magnetic field sensor, receiving a first position signal indicating the moveable vehicle accessory has begun changing position, halting storage of the magnetic field data from the magnetic field sensor based on the first position signal, receiving a second position signal indicating the moveable vehicle accessory has ceased changing position, recommencing storing the magnetic field data from the magnetic field sensor based on the second position signal, and determining a correction value based on the magnetic field data stored before receipt of the first position signal and the magnetic field data stored after receipt of the second position signal.

BRIEF DESCRIPTION OF THE DRAWINGS

The invention will be more readily understood by reference to the following description taken with the accompanying drawings, in which.

DETAILED DESCRIPTION OF THE PREFERRED AND OTHER EXEMPLARY EMBODIMENTS

Figure 1:
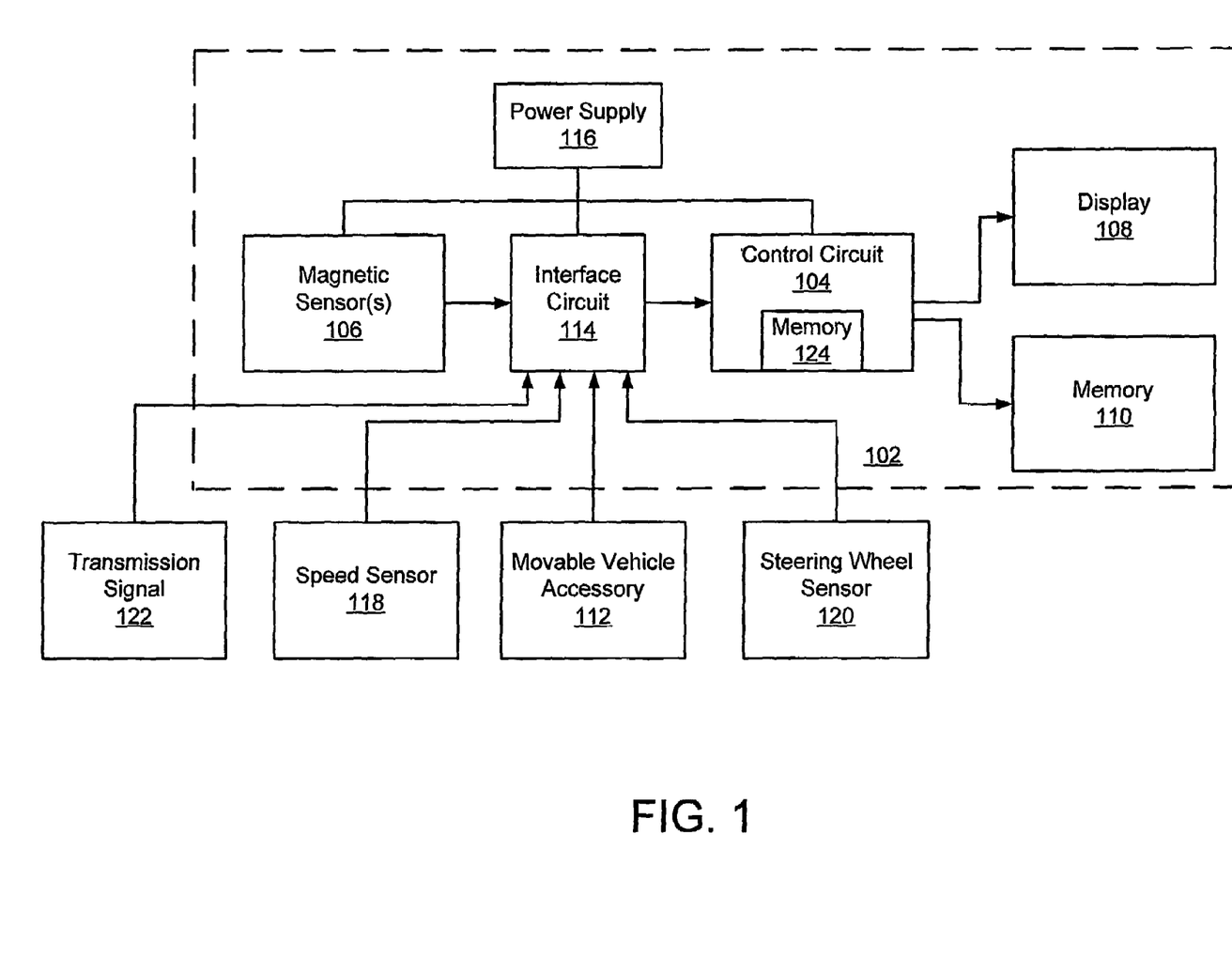
FIG. 1 is a block diagram of an electronic compass system in accordance with an embodiment.

FIG. 1 is a block diagram of an electronic compass system in accordance with an embodiment. Electronic compass 102 includes a magnetic field sensor or sensors 106, a compass control circuit 104, an interface circuit 114, a display 108 and a memory 110. One or more components of electronic compass 102 may be mounted in a vehicle inside an interior vehicle element such as an overhead console, a rearview mirror, a visor, a dashboard, an instrument cluster or other appropriate location. In one embodiment, magnetic field sensor 106 is comprised of individual sensors which sense separate orthogonal components (or channels) of the Earth's magnetic field. For example, a first sensor may be oriented to sense the component of the Earth's magnetic field existing along an axis corresponding to the vehicle's direction of travel and a second sensor may be oriented to sense the component existing in a direction perpendicular to the vehicle's direction of travel. Magnetic sensor(s) 106 may be, for example, a flux gate type sensor, a magnetoinductive sensor, a magnetoresistive sensor, or other device which can sense the Earth's magnetic field and provide signals representative thereof to the compass control circuit 104. Magnetic field sensor 106 generates magnetic field data based on the sensed or measured magnetic fields.

Magnetic field sensor 106 is coupled to control circuit 104 through an electrical interface circuit 114. Electrical interface circuit 114 can take various forms and can comprise electrical conductors, buffers, amplifiers, and/or other electrical components. Compass control circuit 104 may comprise one or more analog and/or digital electrical or electronic components, and may include a microprocessor, microcontroller, application-specific integrated circuit (ASIC), programmable logic, and/or other analog and/or digital circuit elements configured to perform various input/output, control, analysis, and other functions to be described herein. In addition, compass control circuit 104 may include internal memory 124 that may be used for storing data while power is applied to the compass 102.

Interface circuit 114 and compass control circuit 104 are coupled via serial communications lines and both process electrical signals supplied by magnetic field sensor(s) 106 and a moveable vehicle accessory 112. Control circuit 104 is also coupled to a nonvolatile memory circuit 110 for storing data. Preferably, control circuit 104 continuously stores the magnetic field data provided by magnetic field sensor 106 during operation by replacing the prior magnetic field data stored with new magnetic field data. In one embodiment, magnetic field data for each magnetic field sensor or channel may be stored in memory 124 of control circuit 104 while power is applied to compass 102. When compass 102 is powered down (e.g., when the vehicle ignition is turned off) the magnetic field data (e.g., the last magnetic field data for each sensor or channel) and other compass data (e.g., calibration data, etc.) is stored and identified in nonvolatile memory 110. Control circuit 104 is configured to determine or calculate a heading based on the magnetic field data, calibration data, etc. using known methods. A display 108 is coupled to control circuit 104 and used to display heading information to the operator of the vehicle. Control circuit 104 is also coupled to a speed sensor 118 and a steering wheel sensor 120. A power supply circuit 116 provides operating voltage to the various electrical components of the compass system and can be coupled to the vehicle battery or other power source.

As mentioned, various vehicle accessories may be positioned sufficiently close to magnetic field sensor 106 so as to interfere with the magnetic field sensed by magnetic field sensor(s) 106. For example, the operation of a stepper motor in an instrument panel, the operation of a vehicle HVAC system or the opening of a door or other closure member when a vehicle is stopped may each cause errors in the reading of an electronic compass. Another source of an interfering magnetic field is a moveable vehicle accessory such as a sunroof. A compass circuit or magnetic field sensors mounted in, for example, an overhead console of a vehicle may be at a distance sufficiently close to a sunroof assembly so that the compass reading is affected by the position and movement of the sunroof. The disturbance caused by a sunroof (or other similar moveable vehicle accessory) typically is unpredictable since the sunroof moves in two directions (e.g., from the open or closed position). The system of FIG. 1 is configured to compensate for the magnetic disturbance caused by a moveable vehicle accessory such as a sunroof. The following discussion will refer to a sunroof although it should be understood that the system and method disclosed herein may also apply to other moveable vehicle accessories such as a seat or convertible top. For example, a compass mounted under a rear seat of a vehicle may be affected by magnetic disturbances caused by movement of the seat or a compass mounted in a rearview mirror may be affected by magnetic disturbances caused by the opening and/or closing of a convertible top.

In FIG. 1, a moveable vehicle accessory (e.g., a sunroof) 112 is coupled through interface circuit 114 to control circuit 104. In one embodiment, sunroof 112 includes a motor switch in the sunroof assembly to detect whether sunroof 112 is moving or not moving (i.e., whether sunroof 112 is changing position). Alternatively, sunroof 112 includes a position sensor that may be coupled to the motor switch of the sunroof to determine whether the sunroof is moving. The motor switch and position sensor may be configured to provide a position signal to control circuit 104 indicating whether sunroof 112 is changing position. In yet another embodiment, the position sensor is also configured to detect the position of sunroof 112 (e.g., open, partially open, etc.) as well as when the position of the sunroof is changing. The movement and/or position data provided by sunroof 112 is used by control circuit 104 in conjunction with the magnetic field data provided by magnetic field sensor(s) 106 to determine magnetic disturbances caused by the movement and/or position of sunroof 112 and to compensate for the magnetic disturbance.

Figure 2A:
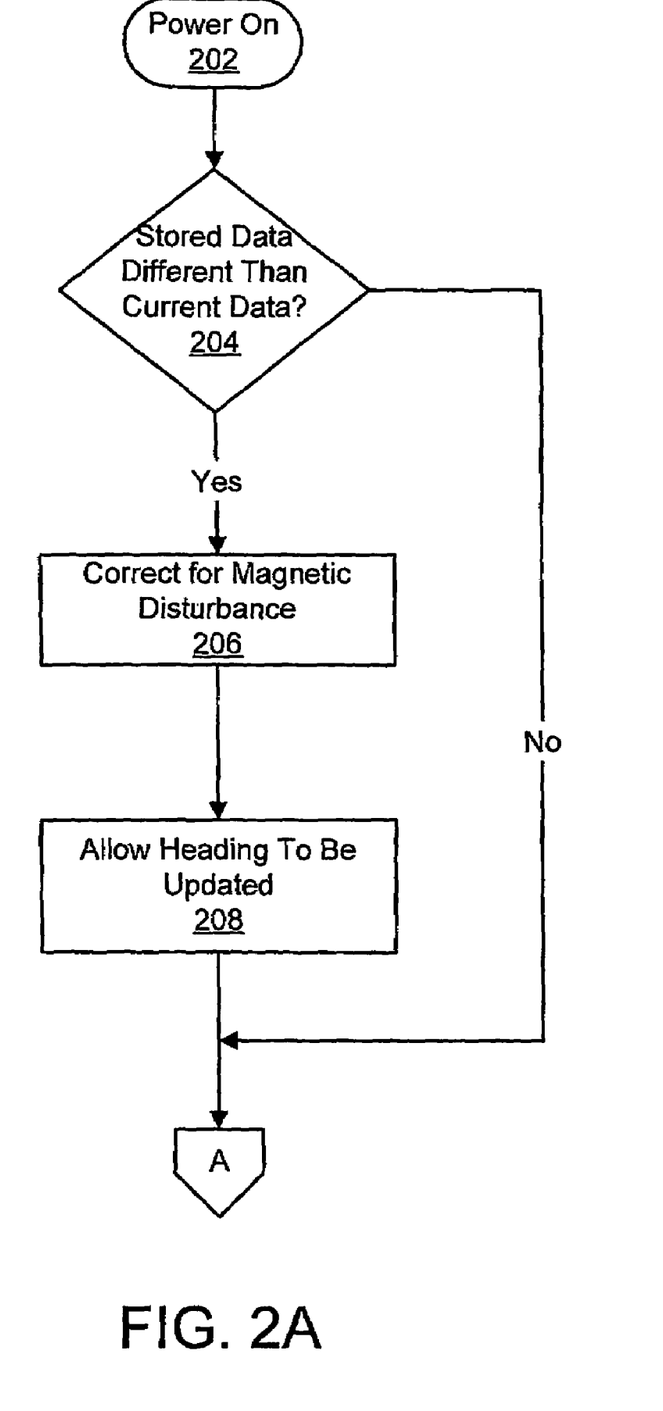
FIGS. 2A-2B illustrate a method for compensating for magnetic disturbance of a compass by a moveable vehicle accessory in accordance with an embodiment.
Figure 2B:
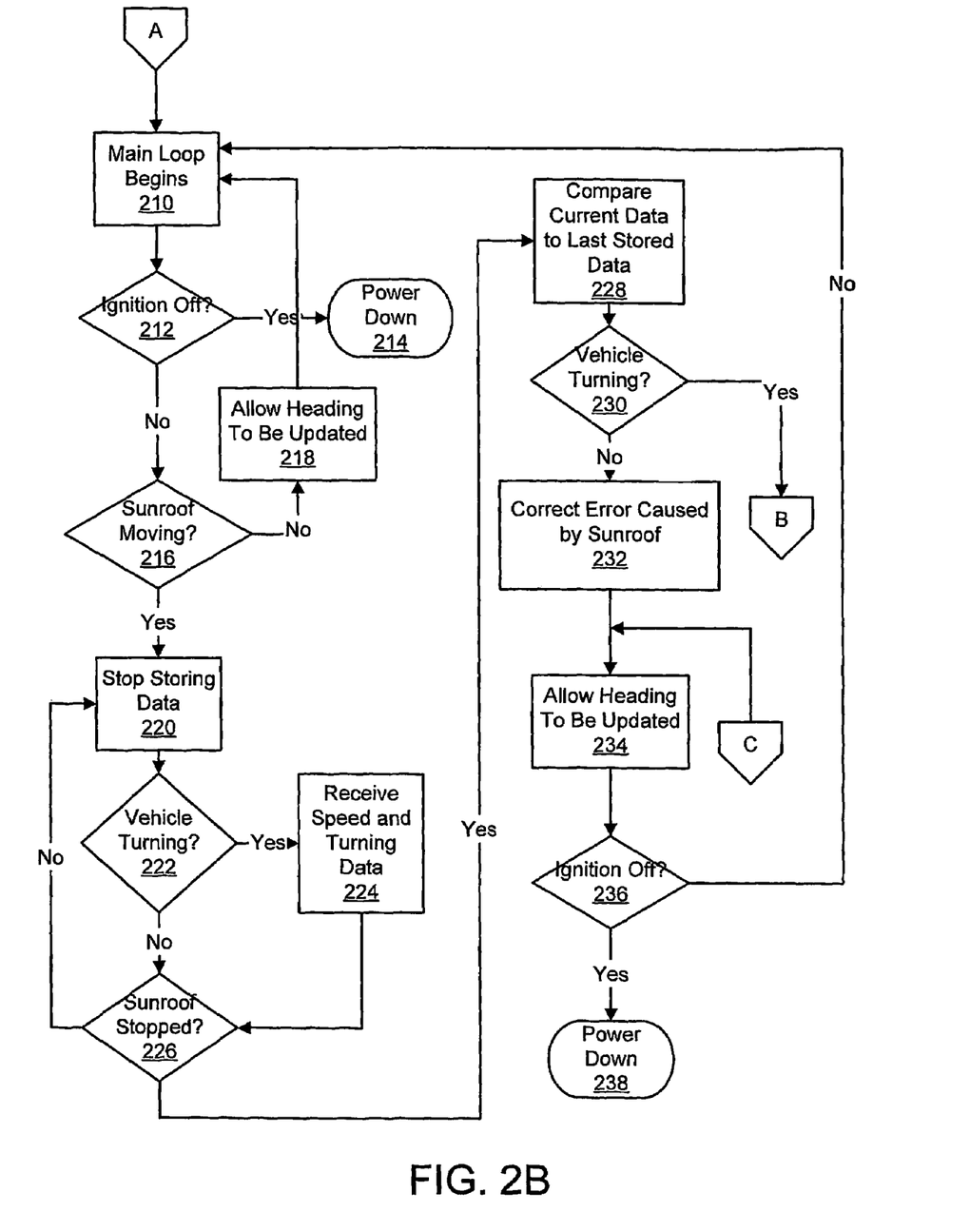

FIGS. 2A-2B illustrate a method for compensating for magnetic disturbance of a compass by a moveable vehicle accessory in accordance with an exemplary embodiment. As mentioned above with respect to FIG. 1, control circuit 104 continuously receives, processes and/or stores the magnetic field data provided by magnetic field sensor 106 while compass 102 is operating. When compass 102 is powered down (e.g., when the ignition is turned off), the last magnetic field reading from magnetic sensor(s) 106 is stored and identified in memory 110. At block 202 in FIG. 2A, the compass system is powered up by, for example, turning on the vehicle ignition. At block 204, the stored magnetic field data for each channel (or sensor) is compared to the current magnetic field data for each channel provided by the magnetic field sensors. A moveable vehicle accessory such as a sunroof may be moved while the compass system is powered down (e.g., when the vehicle ignition is turned off) and may cause a disturbance that should be compensated for. If the stored magnetic field data is different than the current magnetic field data at block 204, then the error caused by the movement of the sunroof may be corrected at block 206 by using the difference between the stored and current magnetic field data as a correction value which may be used to, for example, update compass calibration values (e.g., a calibration offset ($V_{ref}$), noise values, filtering values, crossings, etc.) for each channel or to correct the magnetic field data measured by each magnetic field sensor. In one embodiment where the calibration values are updated, the difference between the stored and current magnetic field data is added to a compass calibration value, $V_{ref}$, to compensate for the movement of the sunroof while the system was powered down. Once the magnetic disturbance caused by the sunroof has been compensated for at block 206, a compass heading is allowed to be updated at block 208 using known methods. If the stored and current magnetic field data are not different at block 204, the process proceeds to block 210 of FIG. 2B.

Referring to FIG. 2B, at block 212, the system determines if the vehicle ignition has been turned off. If the vehicle ignition has been turned off, the current magnetic field data and other compass data is stored in memory and the compass system will power down at block 214. If the vehicle ignition has not been turned off, the process continues at block 216. As mentioned above, control circuit 104 is coupled to sunroof 112 which includes a motor switch and/or position sensor that may be used to detect whether or not the sunroof is moving. If the sunroof is moving at block 216, the control circuit stops storing the magnetic field data provided by the magnetic field sensor(s) at block 220. The magnetic field data sensed by the magnetic field sensor may continue to be received, however, the data stored in memory is not replaced with the new magnetic field data. If the sunroof is not moving, the heading is allowed to be updated at block 218 and the process returns to block 210 and waits for an indication that the sunroof is changing position or that the compass is being powered down. At block 222, if the vehicle is not turning (i.e., moving in a straight direction), the process proceeds to block 226 where it is determined whether the sunroof has stopped moving. If the vehicle is turning at block 222, control circuit 104 (see FIG. 1) begins to store wheel position data received from a steering wheel sensor 120 (see FIG. 1) and speed data from a speed sensor 118 (see FIG. 1) at block 224. This data maybe used to determine the magnetic field while the vehicle is changing direction, as discussed further below with respect to FIG. 3.

Returning to block 220, control circuit 104 stops storing magnetic field data for each channel until it receives an indication from sunroof 112 at block 226 that the sunroof has stopped moving. The position signal may also indicate the current position of the sunroof (e.g., partially open, completely open, etc.). Once the sunroof has stopped moving at block 226, the control circuit stores the current magnetic field data from each magnetic field sensor and at block 228 compares it to the last magnetic field data stored for each sensor before the sunroof began moving. If the vehicle is moving in a straight direction at block 230 (i.e., the vehicle is not turning), the difference between the current and stored magnetic field data is used as a correction value which may be added to compass calibration values for each channel to compensate for the movement and new position of the sunroof at block 232. In an alternative embodiment, the correction value may be used to correct the magnetic field data measured by each sensor before the magnetic field data is supplied to calibration algorithms or used to determine a heading. Once the correction value has been applied at block 232, the heading may be updated at block 234 using known methods. As mentioned above, a direction status signal from a steering wheel sensor 120 (see FIG. 1) coupled to the steering wheel of the vehicle may be used to indicate when the vehicle is changing direction. At block 236, the system determines if the vehicle ignition has been turned off. If the vehicle ignition has not been turned off, the process returns to block 210. If the ignition has been turned off at block 236, the current magnetic field data and other compass data is stored and the compass system will power down at block 238.

Returning to block 230 of FIG. 2B, it is determined whether the vehicle is changing direction. Turning the vehicle also causes a change in the magnetic field measured by the compass. If the vehicle is turning, the system preferably determines how much of the total measured magnetic field is due to the vehicle turning and how much is due to the movement and/or position of the sunroof assembly. Accordingly, an appropriate correction may be made for the error caused by the sunroof assembly and the magnetic field change due to turning the vehicle may be used to determine a heading. Whether or not the vehicle is turning may be determined based on, for example, a signal from a steering wheel sensor 120 (see FIG. 1) coupled to the vehicle steering wheel and a speed signal from a speed sensor 118 (see FIG. 1). A transmission signal 122 (see FIG. 1) may also be used in combination with the speed and steering wheel data. The transmission signal 122 provides data regarding the state (e.g., forward, reverse) of the transmission of the vehicle. Alternatively, in a vehicle with an ABS braking system, a wheel velocity and/or distance measurement for each front wheel may be compared. Typically, each of the front wheels will travel a different distance if the vehicle is turning. If the vehicle is turning at block 230, various methods may be used to determine the error caused by the sunroof assembly and the magnetic field change caused by the turning of the vehicle as discussed further below with respect to FIGS. 3 and 4.

Figure 3:
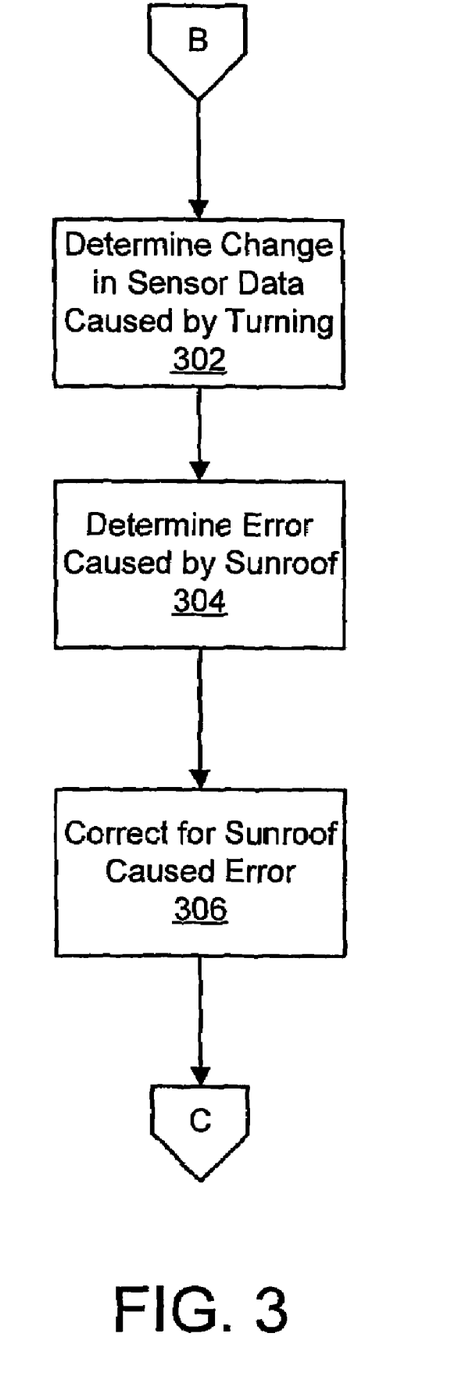
FIG. 3 illustrates a method for compensating for magnetic disturbance of a compass by a moveable vehicle accessory while the vehicle is changing direction in accordance with an embodiment.
Figure 4:
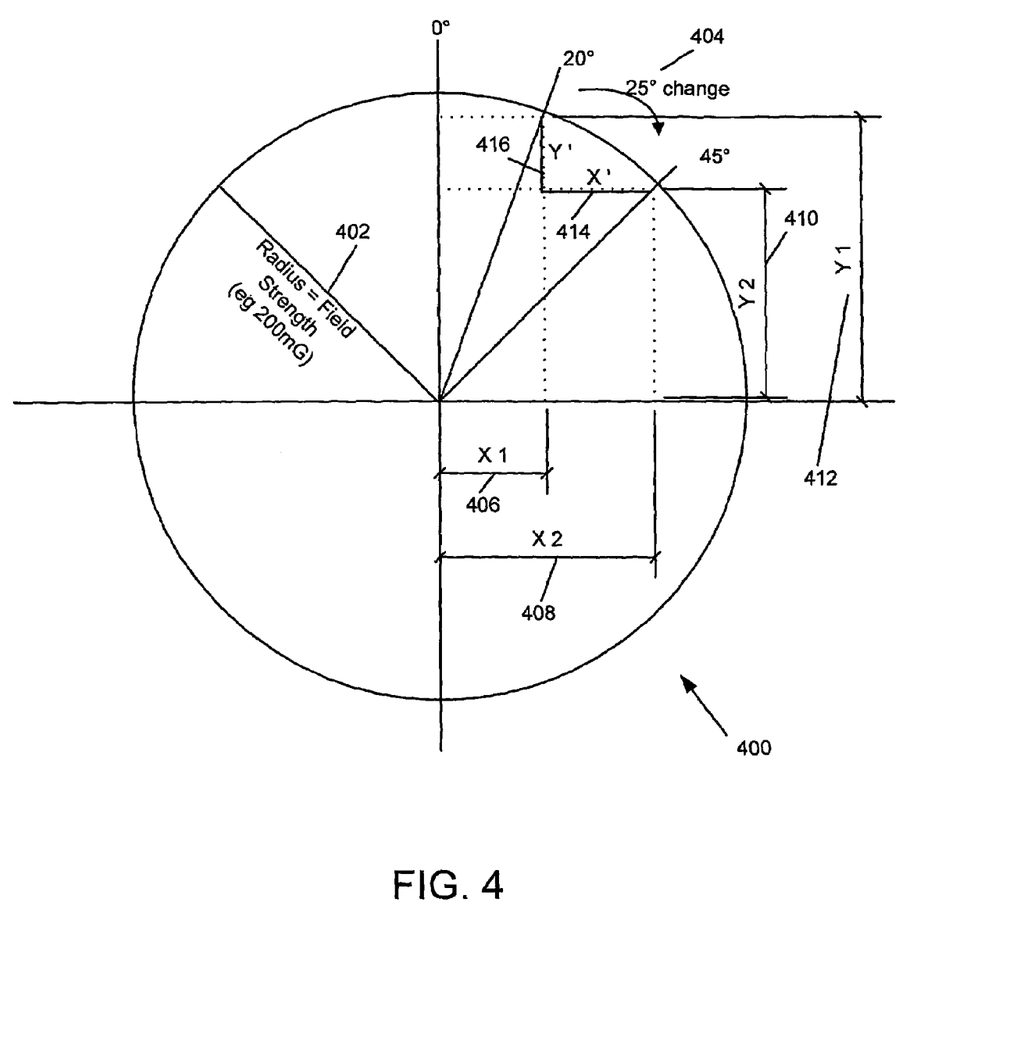
FIG. 4 illustrates an exemplary method for determining a magnetic change caused by a vehicle changing direction in accordance with an embodiment.

As mentioned above, if the vehicle is turning when the sunroof is moving, control circuit 104 (see FIG. 1) begins to store the speed and steering wheel data at block 222. Referring now to FIG. 3, at block 302, the steering wheel sensor data and the vehicle speed are used to determine the magnetic change due to the turning of the vehicle (and further the change due to the sunroof movement which should be corrected for). In one embodiment, the size and/or distance of the turn and the strength of the Earth's magnetic field at the location of the vehicle may be used to determine a magnetic field due to the turning of the vehicle. FIG. 4 illustrates an exemplary method for determining a magnetic change caused by a vehicle changing direction in accordance with an embodiment. In FIG. 4, the graph 400 shows an example in which the vehicle is driving at a heading of 20° and then turns to a heading of 45°. The angle/degrees of the turn made by the vehicle may be determined based on the steering wheel signal, the speed of the vehicle, the number of revolutions of the tires, etc. using known methods. In the example shown in FIG. 4, the vehicle has made a 25° turn (404). Assuming the compass includes a first and a second magnetic sensor (e.g., two channels), the magnetic change for each channel, X' (414) and Y' (416) may be determined based on the field strength and the starting and ending angles of the turn. The field strength 402 is represented by the radius of the circle in FIG. 4.

The magnetic change for each channel, X'(414) and Y'(416) may be determined using the following equations:

$$X' = X2 - X1 \quad (1)$$

$$Y' = Y2 - Y1 \quad (2)$$

where $$X1 = \text{Field strength} * \sin(\text{starting angle}) \quad (3)$$

$$X2 = \text{Field strength} * \sin(\text{ending angle}) \quad (4)$$

$$Y1 = \text{Field strength} * \cos(\text{starting angle}) \quad (5)$$

$$Y2 = \text{Field strength} * \cos(\text{ending angle}) \quad (6)$$

Depending on the quadrant and the magnitude of the heading difference, the signs of the above equations may change. In addition, in other embodiments, the sine and cosine functions may be interchanged in the equations. In the specific example shown in FIG. 4, the starting angle is 20°, the ending angle is 45° and the field strength is 200 mG. Accordingly, applying these values to the above equations:

$$X' = 73 \text{ mG; and}$$

$$Y' = -47 \text{ mG}$$

At block 304, the magnetic change caused by the sunroof is determined by comparing the magnetic change caused by the turning of the vehicle (X' and Y') determined at block 302 to the magnetic shift determined at block 228 of FIG. 2B for the time period the sunroof was moving. The difference between these two values for each channel is the magnetic disturbance caused by the sunroof for each channel. This difference is used as a correction value. Once the error caused by the sunroof has been determined, the system makes a correction for the error caused by the sunroof at block 306 using the correction value so that the magnetic change caused by turning the vehicle may be used to update the heading. For example, the amount of magnetic change or shift caused by the sunroof may be added to the compass calibration values. Alternatively, the correction value may be applied to the magnetic field data measured by the sensor(s). The process then returns to block 234 of FIG. 2B and the heading may be updated.

Figure 5:
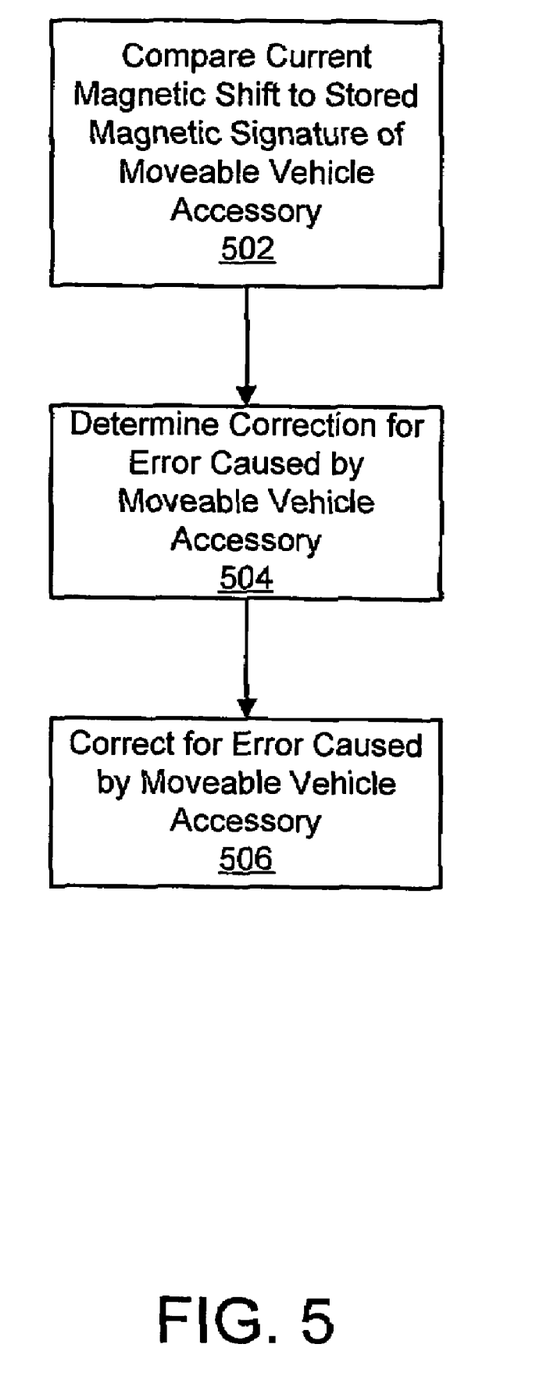
FIG. 5 illustrates a method for compensating for magnetic disturbance of a compass by a moveable vehicle accessory while the vehicle is changing direction in accordance with an alternative embodiment.

FIG. 5 illustrates an alternative method for compensating for the magnetic disturbance caused by a moveable vehicle accessory while the vehicle is changing direction. At block 502, the current magnetic shift determined for the time period the moveable vehicle accessory is moving (block 228 of FIG. 2B) is compared to a stored magnetic signature for the moveable vehicle accessory. For example, the compass may store in memory the magnetic shifts associated with the common positions of the moveable vehicle accessory such as an open position, a partially open position, etc. Based on the position information provided by the moveable vehicle accessory, the compass control circuit may retrieve from memory a magnetic shift associated with that position. Alternatively, a magnetic signature may be determined by averaging the magnetic shifts from a predetermined number of prior operations of the moveable vehicle accessory. In yet another embodiment, the stored magnetic signature is based on maximum and minimum magnetic fields caused by the movement of the moveable vehicle accessory. For example, at the initial calibration of the compass, the moveable vehicle accessory may be cycled from closed to fully open. The compass records the maximum and minimum magnetic fields measured during this cycle. The maximum and minimum values may be updated when the moveable vehicle accessory is cycled from closed to fully open when the vehicle speed is zero.

As mentioned, at block 502, the magnetic shift caused by the current movement of the moveable vehicle accessory is compared to a stored magnetic signature for the compass. The comparison is used to determine a correction value for the compass calibration values or measured magnetic field data at block 504. For example, the stored magnetic signature data for the compass may indicate the maximum shift measured by the compass for the movement of the moveable vehicle accessory from closed to fully open is 50 mG. The magnetic shift caused by turning of a vehicle (e.g., a 90 degree turn) may be significantly greater than the maximum magnetic shift caused by the moveable vehicle accessory. If the measured magnetic shift is significantly more than the stored maximum value for the moveable vehicle accessory, it may indicate that the vehicle has turned and the control circuit can use the maximum value (e.g., 50 mG) to correct, for example, the calibration values. At block 506, the correction is applied by, for example, adding the correction to the compass calibration values or applying the correction value to the magnetic field data measured by the magnetic field sensor(s).

It is important to note that the construction and arrangement of the elements of the electrical compass system as shown in the preferred and other exemplary embodiments are illustrative only. Although only a few embodiments of the present invention have been described in detail in this disclosure, those skilled in the art who review this disclosure will readily appreciate that many modifications are possible (e.g., variations in sizes, dimensions, structures, shapes and proportions of the various elements, values of parameters, mounting arrangements, circuit components, etc.) without materially departing from the novel teachings and advantages of the subject matter recited herein. Accordingly, all such modifications are intended to be within the scope of the present invention as described herein. For example, the calibration method disclosed herein can be combined with one or more of the calibration methods set forth in U.S. Pat. Nos. 5,953,305, 5,737,226, or 6,301,794, which are herein incorporated by reference. The order or sequences of any process or method steps may be varied or re-sequenced according to alternative embodiments. Other substitutions, modifications, changes and/or omissions may be made in the design, operating conditions and arrangement of the preferred and other exemplary embodiments without departing from the exemplary embodiments of the present invention as expressed herein.

What is claimed is:

1. A vehicle compass system for compensating for magnetic disturbances caused by a moveable vehicle accessory, the vehicle compass system comprising:

a magnetic field sensor configured to determine an orientation of the magnetic field sensor with respect to the Earth's magnetic field and to generate magnetic field data, the magnetic field sensor positioned at a distance from the moveable vehicle accessory; and a control circuit coupled to the moveable vehicle accessory and the magnetic field sensor, the control circuit configured to receive a position signal from the moveable vehicle accessory indicating whether the moveable vehicle accessory is changing position, to receive magnetic field data from the magnetic field sensor, to compare first magnetic field data generated prior to the change in position of the moveable vehicle accessory to second magnetic field data generated after the change in position of the moveable vehicle accessory and to generate a correction value based on the comparison of the first magnetic field data and the second magnetic field data;

wherein the correction value is used to correct for the magnetic disturbance caused by the moveable vehicle accessory.

2. A vehicle compass system according to claim 1, wherein the correction value is used to update at least one calibration value.

3. A vehicle compass system according to claim 1, wherein the correction value is used to correct third magnetic field data generated after the change in position of the moveable vehicle accessory.

4. A vehicle compass system according to claim 1, wherein the magnetic field sensor further comprises:
a first magnetic field sensor configured to measure magnetic field data with respect to a first magnetic axis;
a second magnetic field sensor configured to measure magnetic field data with respect to a second magnetic axis orthogonal to the first magnetic axis.

5. A vehicle compass system according to claim 1, wherein the control circuit is coupled to a control switch of the moveable vehicle accessory, the control switch configured to generate the position signal.

6. A vehicle compass system according to claim 1, wherein the control circuit is coupled to a position sensor of the moveable vehicle accessory, the position sensor configured to determine whether the moveable vehicle accessory is changing position and to generate the position signal.

7. A vehicle compass system according to claim 6, wherein the position sensor is further configured to determine a position of the moveable vehicle accessory and the position signal is further configured to indicate the position of the moveable vehicle accessory.

8. A vehicle compass system according to claim 1, wherein the moveable vehicle accessory is a sunroof.

9. A vehicle compass system according to claim 1, wherein the control circuit is configured to detect a change in position of the moveable vehicle accessory which occurs while the vehicle compass system is powered down.

10. A vehicle compass system according to claim 1, further comprising:
a steering wheel sensor coupled to the control circuit and configured to provide a direction status signal indicating whether the vehicle is changing direction; and
a speed sensor coupled to the control circuit and configured to provide a speed signal indicating the speed of the vehicle;
wherein the control circuit is further configured to determine a magnetic disturbance caused by the changing of direction of the vehicle based on the direction status signal and the speed signal.

11. A vehicle compass system according to claim 10, wherein, in response to a direction status signal indicating the vehicle is changing direction, the control circuit is configured to compare the correction value to a stored magnetic shift value for the moveable vehicle accessory and to determine a magnetic disturbance caused by the change in position of the moveable vehicle accessory and a magnetic disturbance caused by the change of direction of the vehicle.

12. A method for compensating for magnetic disturbances of a compass caused by a moveable vehicle accessory positioned a distance from a magnetic field sensor of the compass, the method comprising:
determining if the moveable vehicle accessory is changing position;
determining first magnetic field data prior to the change in position of the moveable vehicle accessory;
determining second magnetic field data after the change in position of the moveable vehicle accessory;
comparing the first magnetic field data and the second magnetic field data;
generating a correction value based on the comparison of the first magnetic field data and the second magnetic field data; and
updating at least one calibration value of the compass based on the correction value.

13. A method according to claim 12, wherein the moveable vehicle accessory is a sunroof.

14. A method according to claim 12, wherein determining if the moveable vehicle accessory is changing position includes receiving a position signal generated by a control switch of the moveable vehicle accessory.

15. A method according to claim 14, wherein the position signal indicates whether the moveable vehicle accessory is changing position.

16. A method according to claim 12, wherein determining if the moveable vehicle accessory is changing position includes receiving a position signal generated by a position sensor of the moveable vehicle accessory.

17. A method according to claim 16, wherein the position sensor is configured to determine the position of the moveable vehicle accessory.

18. A method according to claim 12, further comprising:
receiving a direction status signal indicating whether the vehicle is changing direction;
receiving a speed signal indicating the speed of the vehicle; and
determining a magnetic disturbance caused by the changing of direction of the vehicle based on the direction status signal and the speed signal.

19. A method according to claim 18, further comprising:
comparing the correction value to a stored magnetic shift value for the moveable vehicle accessory; and
determining a magnetic disturbance caused by the change in position of the moveable vehicle accessory and the magnetic disturbance caused by the changing direction of the vehicle.

20. A method for compensating for magnetic disturbances of a compass caused by a moveable vehicle accessory positioned a distance from a magnetic field sensor of the compass, the method comprising:
determining if the moveable vehicle accessory is changing position;
determining first magnetic field data prior to the change in position of the moveable vehicle accessory;
determining second magnetic field data after the change in position of the moveable vehicle accessory;
comparing the first magnetic field data and the second magnetic field data;
generating a correction value based on the comparison of the first magnetic field data and the second magnetic field data; and correcting third magnetic field data determined after the change in position of the moveable vehicle accessory based on the correction value.

21. A method for compensating for magnetic disturbances of a compass caused by a moveable vehicle accessory, the method comprising:

receiving magnetic field data from a magnetic field sensor positioned a distance from the moveable vehicle accessory;

recording the magnetic field data from the magnetic field sensor;

receiving a first position signal indicating the moveable vehicle accessory has begun changing position;

halting storage of the magnetic field data from the magnetic field sensor based on the first position signal;

receiving a second position signal indicating the moveable vehicle accessory has ceased changing position;

recommencing storing the magnetic field data from the magnetic field sensor based on the second position signal; and determining a correction value based on the magnetic field data stored before receipt of the first position signal and the magnetic field data stored after receipt of the second position signal.

22. A method according to claim 21, wherein the moveable vehicle accessory is a sunroof.

23. A method according to claim 21, wherein the correction value is used to update at least one calibration value of the vehicle compass system.

24. A method according to claim 21, wherein the correction value is used to correct magnetic field data received after receipt of the second position signal.

* * * * *